Oct. 29, 1929.  E. F. HARRISON  1,734,011
PROCESS OF PURIFYING POLLUTED WATER, SEWAGE, AND THE
LIKE BY A CHEMO-BIOLOGICAL-MECHANICAL PROCESS
Filed Feb. 25, 1926

WITNESS:

INVENTOR
Edward F. Harrison.
BY Augustus B Stoughton
ATTORNEY.

Patented Oct. 29, 1929

1,734,011

UNITED STATES PATENT OFFICE

EDWARD F. HARRISON, OF PHILADELPHIA, PENNSYLVANIA, ASSIGNOR TO CHEMO-MECHANICAL WATER IMPROVEMENT COMPANY, INC., OF PHILADELPHIA, PENNSYLVANIA, A CORPORATION OF PENNSYLVANIA

PROCESS OF PURIFYING POLLUTED WATER, SEWAGE, AND THE LIKE BY A CHEMO-BIOLOGICAL-MECHANICAL PROCESS

Application filed February 25, 1926. Serial No. 90,680.

Hitherto in bacteriological processes and in modifications thereof, enzyme and bacteriophage have never been considered as an active agent, as well as in certain processes involving the use of chemicals; air has been the sole factor in use for the purification of polluted water, sewage and the like, whereas intense agitation applied to the body of such material with the surface exposed to the atmosphere will produce results as described hereinafter. Air has been supplied at the bottom and permitted to bubble up through the sludge and mass. For this purpose use was sometimes made of expensive and specially prepared plates which supported the mass and were intended to permit the air to filter through them in a manner that did not unduly disturb the mass but the activated sludge method of aeration is an exception, for in the design of the plants installed and in the way that they practice the art, it requires the pumping of 1.50 cu. ft. of air to each gallon (0.13369 cu. ft.) of liquid or 11.22 times as much air as liquid. In any case air introduced at the bottom and rising through the mass has a tendency to cause flotation and in the case of plates they become clogged and reduce the efficiency of the aeration. The application of air from the bottom however effected presents other disadvantages. It disturbs the sediment permitting the new material to reach the bottom and become covered by the old material which has undergone complete decay and which opposes proper action in the new material. It tends to force settled matter undergoing decomposition to rise to the surface and this floating matter has a tendency through decomposition to fall and in its downward course coming in contact with the ascending air opposes rapid sedimentation. Moreover air released at the bottom in rising will follow the lines or paths of least resistance and not reach the portions where it is most needed and too much aeration in one locality prevents proper clarification. It is well known that aeration is necessary to cause the bacteriological reaction involved as the bacteriological reaction consumes oxygen or air from the water. Hitherto scum forming on the surface not only prevented the absorption of air but could not be removed by the air which bubbled up through the mass from the bottom where it was introduced.

The principal object of the present invention is to overcome the above mentioned, as well as other well understood defects and disadvantages, and for the accomplishment of this object the present invention, generally stated, comprises the improvement in the art which consists of selective and controlled intense agitation in combination with the introduction of enzyme and bacteriophage continuously into the mass from above through the medium of fluid jets forced into it and to produce elutriation and sedimentation by agglutination.

In the practice of the invention fluid, as water, may be withdrawn from the body of material which could contain a portion of the muck or solid matter, the product of the process, which would have a tendency to add its weight to the suspended and floating matter and cause same to sink more rapidly, whereas, special sewage with large proportions of dissolved organic matter with but little material in suspension it would be advantageous to return the clear water or fluid as it is about to leave the process due to the fact that it carries the maximum quantity of enzyme and bacteriophage which can be pumped up and discharged from above in the form of jets driven or squirted continuously with sufficient force to traverse the atmosphere and to strike the surface and to enter the mass of the body below the surface thereof, thus introducing enzyme and bacteriophage and air from the top and, if desired, these jets may be driven with sufficient force to reach the sediment at the bottom of the body and to agitate and mix it in any required degree. If desired, the fluid jets may contain appropriate chemicals and it is not essential that they be taken from the body under treatment. Such chemicals as lime, soda, etc., to produce a neutral plus alkalinity condition in the treating mass is favorable to the development of aerobic bacteria, their enzyme and bacteriophage, but in special cases where the biological action is not considered, such chemicals as acid, aluminum sulphate, etc., or chlorine gas or equal, etc., may be used to an advantage. By the present invention the agitation and aeration can be controlled accurately and the jets may be discharged from an elevation above the surface at right angles or at an inclination to the surface, or the jets can be so constructed as to revolve in a circular motion on a horizontal plane or on a vertical plane, thus assuring thorough agitation and circulation at all parts of the body above the muck. The fluid or water jets striking the surface and acting beneath the same produces continuous mechanical agitation which prevents the formation of large aggregations of bacteria and a heavy coating at the top and insures proper aeration and a thorough mixing of enzyme and bacteriophage and oxygen with all parts of the body. The surface agitation also eliminates the breeding of insects and vermin on top of the body.

In connection with the following description reference may be made to the accompanying drawings in which the same parts are designated by the same reference number and in which Figure 1 is a diagrammatic or schematic view generally illustrating apparatus that can be used in the practice of the process, and illustrating the relative proportions of the ingredients after treatment.

Figure 1:
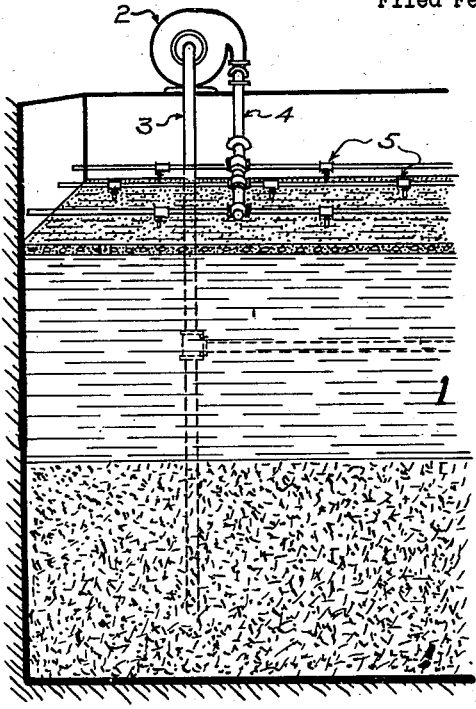
Figure 4:
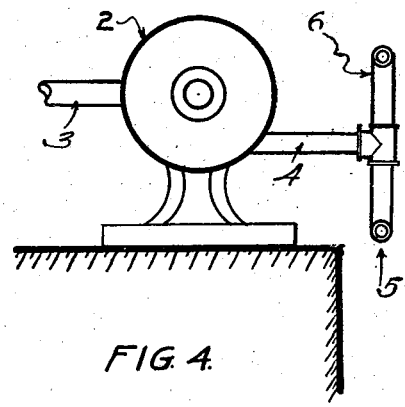
Figure 4 illustrates the shape of a nozzle that can be used to discharge the solutions in a revolving circular movement on a vertical plane.
Figure 3:
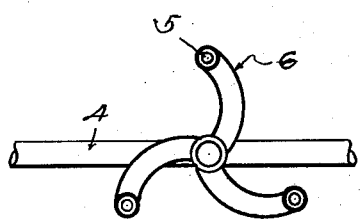
Figure 3 illustrates the shape of a nozzle that can be used to discharge the solutions in a revolving circular movement on a horizontal plane.
Figure 2:
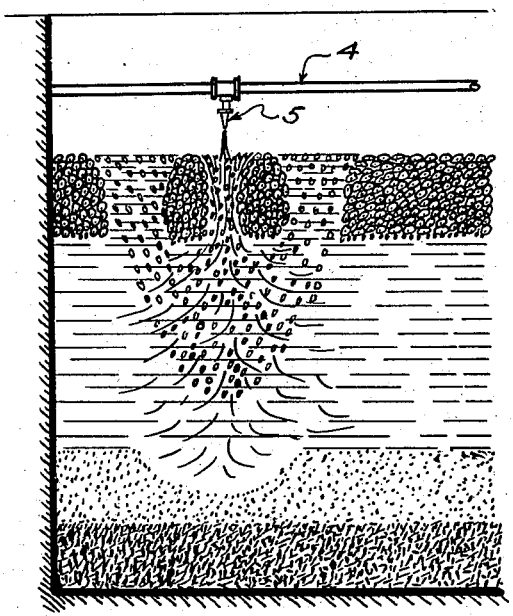
Figure 2 is a like view illustrating the action of one jet, but showing loose material (as distinguished from a coating) at the top to a very greatly exaggerated depth.

In the drawings 1 indicates the receptacle in which a body of material, as sewage, is collected. The pump 2 and intake 3 and discharge connections 4, including the nozzles 5, are a means for taking solutions from the receptacle 1 and producing jets which are discharged through the air and into the surface and into the mass of the body.

The theory involved in the chemo-biological-mechanical features of my invention are: The sedimentation and decay by oxidation through the agency of aerobic bacterio and other organisms including both prototrophic and metatrophic types, which require air, oxygen, organic matter, etc., for their multiplication, or existence. This group of bacteria is more desirable inasmuch as, they cause the production of nitrates in the product which would be available for fertilizer. Their multiplication is best cultivated by agitation as described. Their feeding upon organic matter may be expressed as consuming the total organic contents, thus producing a complete sewage disposal system within itself, eliminating the sprinkling filter addition, whereas, the anaerobic group of bacteria thrives in the absence of air and agitation. They produce only a partial decomposition of the organic contents, consuming the oxygen held in combination with organic matter, thus breaking down the solids into simpler bodies, some of which are dissolved in the liquid and others liberated in the form of gas. The black liquid effluent produced by such bacteria is minus oxygen plus dissolved gases, etc., must be retreated by aeration, in a mechanical design designated as a sprinkling filter, thereby, permitting the first mentioned group of bacteria to finish the decomposition of organic matter, in order to prevent a nuisance. The multiplication of the anaerobic group of bacteria is prevented by agitation and aeration, such as described, furthermore, the action of bacteria produces an enzyme and when applied with air and agitation to untreated incoming sewage produces a catalytic action of great intensity, furthermore, the bacteriophagic action reaches its highest efficiency for the action is accelerated by bringing about a thorough mixing, stirring and breaking up of the bacteria flora and solid matter.

The result of this process is oxidation of the organic matter, rapid sedimentation of oxidized suspended matter, clarification by elutriation and sedimentation and a large reduction in the total count of bacteria through the process of bacteriophagia, thus obtaining a chemo-biological-mechanical action, producing a heavy compact flock that will settle more rapidly than the light loose flock that is produced by other methods wherein the air is released under plates or otherwise at the bottom of the mass.

It will be obvious to those skilled in the art to which the invention relates that modifications may be made in details of procedure and in more matters of form without departing from the spirit of the invention which is not limited as to those matters or otherwise than as the appended claims and the prior art may require.

I claim:

1. In the art of purifying polluted water, sewage and like materials the improvement which consists in collecting a body of the material and discharging air bearing jets under considerable pressure of such fluid containing precipitated matter, enzyme and bacteriophage, the product of the process, downwardly through the atmosphere onto the top surface of the body penetrating a considerable distance into the mass under the top surface thereof.

2. In the art of purifying polluted water, sewage and like materials the improvement which consists in collecting a body of the material with its surface exposed to the atmosphere and squirting fluid containing muck, enzyme and bacteriophage, the product of the process, under considerable pressure downwardly from above and through the atmosphere into the mass being treated penetrating a considerable distance into the body of such liquid, past the surface thereof.

3. In the art of purifying polluted water, sewage and like materials the improvement which consists in collecting a body of the material with its surface exposed to the atmosphere and discharging jets under considerable pressure of such fluid containing enzyme and bacteriophage, the product of the process, and chemicals, downwardly from above and through the atmosphere into the liquid being treated so that it penetrates a considerable distance into the body of such liquids.

4. In the chemo-biological-mechanical purification process the improvement which consists in introducing precipitated matter, enzyme and bacteriophage, the product of the process, with air from above by discharging jets of fluid under considerable pressure through the atmosphere into the mass being treated so that it penetrates a considerable distance under the surface thereof.

5. In the chemo-biological-mechanical purification process the improvement which consists in introducing enzyme and bacteriophage in large quantities, the product of the process, with air from above by discharging jets of such fluid under considerable pressure downwardly through the atmosphere into the body of the material being treated so that it penetrates to the muck at the bottom thereof.

6. In the chemo-biological-mechanical purification process the improvement which consists in introducing enzyme and bacteriophage, the product of the process, with air from above by discharging jets of such fluid under considerable pressure continuously downwardly through the atmosphere into the body of the material being treated so that it penetrates a considerable distance to bring about elutriation, agglutination and bacteriophagia.

7. In the art of purifying polluted water, sewage and like materials, the improvement which consists in collecting a body of the material and returning a portion of the clear water or liquid as it is about to leave the process by driving air bearing jets of such fluid under considerable pressure downwardly onto the top surface of the body and into the mass of the body for a considerable distance past the top surface thereof.

8. In the art of purifying polluted water, sewage and like materials, the improvement which consists in collecting a body of the material with its surface exposed to the atmosphere and returning a portion of the clear water or liquid as it is about to leave the process by squirting such fluid under considerable pressure downwardly from above and through the atmosphere and into the mass of the body below the surface thereof so that it penetrates a considerable distance to produce elutriation.

9. In the art of purifying polluted water, sewage and like material, the improvement which consists in collecting a body of the material with its surface exposed to the atmosphere and returning a portion of the clear water or liquid as it is about to leave the process by squirting such fluid under considerable pressure containing added chemicals downwardly from above and through the atmosphere and into the mass of the body below the surface thereof, so that it penetrates a considerable distance into the body thereof.

10. In the chemo-biological-mechanical purification process, the improvement which consists in introducing large quantities of enyme and bacteriophage, the product of the process, with air from above by discharging jets of fluid extracted from the process at about the point of the longest detention period under considerable pressure through the atmosphere so that it penetrates a considerable distance past the surface there, into the body of the material being treated.

11. In the chemo-biological-mechanical purification process, the improvement which consists in introducing enzyme, bacteriophage and muck, the product of the process, with air from above by discharging jets of fluid extracted from the process at about the point of the longest detention period under considerable pressure downwardly through the atmosphere into the body of the material being treated to the muck at the bottom thereof, to produce elutriation and agglutination.

12. In the chemo-biological-mechanical purification process, the improvement which consists in introducing enzyme and bacteriophage, the product of the process, with air from above by discharging jets of fluid extracted from the process at about the point of the longest detention period under considerable pressure downwardly through the atmosphere into the body of the material being treated penetrating for a considerable distance to bring about the destruction of the bacteria.

13. In the art of purifying polluted water, sewage and like materials, the improvement which consists in collecting a body of the material and driving air bearing jets of fluid containing enzyme and bacteriophage and a portion of the muck, the product of the process continuously under considerable pressure downwardly onto the top surface of the body and into the mass penetrating for a considerable distance into the body and past the top surface thereof.

14. In the art of purifying polluted water, sewage and like materials, the improvement which consists in collecting a body of the material with its surface exposed to the atmosphere and squirting fluid containing enzyme and bacteriophage and a portion of the solid matter, the product of the process, downwardly under considerable pressure from above and through the atmosphere and into the mass of the body for a considerable distance below the surface thereof.

15. In the art of purifying polluted water, sewage and like materials, the improvement which consists in collecting a body of the material with its surface exposed to the atmosphere and squirting fluid containing enzyme and bacteriophage and a portion of the muck, the product of the process, in combination with added chemicals downwardly under considerable pressure from above and through the atmosphere and into the mass of the body for a considerable distance below the surface thereof.

16. In the chemo-biological-mechanical purification process, the improvement which consists in introducing a portion of the muck, the product of the process, with air from above by discharging jets of such fluid under considerable pressure downwardly through the atmosphere into the body of the material being treated for a considerable distance to produce elutriation and agglutination.

17. In the chemo-biological-mechanical purification process, the improvement which consists in introducing enzyme and bacteriophage and a portion of the muck, the product of the process, with air from above by discharging jets of such fluid under considerable pressure downwardly through the atmosphere into the body of the material being treated to the muck at the bottom thereof, and to produce elutriation.

18. In the chemo-biological-mechanical purification process, the improvement which consists in introducing enzyme and bacteriophage and a portion of the muck, the product of the process with air from above by discharging jets of such fluid under considerable pressure downwardly through the atmosphere into the body of the material being treated so that it penetrates for a considerable distance to cause bacteriophagia and to produce elutriation and agglutination.

19. In the art of purifying polluted water, sewage and like materials, the improvement which consists in collecting a body of the material and returning a portion of the liquid as it is about to leave the process by driving air bearing jets of such fluid under considerable pressure in a circular movement onto the top surface of the body so that it penetrates for a considerable distance into the mass of the body and past the top surface thereof.

20. In the art of purifying polluted water, sewage and like materials, the improvement which consists in collecting a body of the material with its surface exposed to the atmosphere and returning a portion of the liquid as it is about to leave the process by squirting such fluid under considerable pressure in a circular movement from above and through the atmosphere and into the mass of the body so that it penetrates a considerable distance below the surface thereof.

21. In the art of purifying polluted water, sewage and like materials, the improvement which consists in collecting a body of the material with its surface exposed to the atmosphere and returning a portion of the liquid as it is about to leave the process by squirting such fluid containing added chemicals under considerable pressure in a circular movement from above and through the atmosphere and into the mass so that it penetrates for a considerable distance into the body below the surface thereof.

22. In the chemo-biological-mechanical purification process, the improvement which consists in introducing enzyme, bacteriophage and muck, the product of the process, with air from above by discharging jets of fluid extracted from the process at about the point of the longest detention period under considerable pressure in a circular movement through the atmosphere into the body of the material being treated so that it penetrates for a considerable distance into the body of such material.

23. In the chemo-biological-mechanical purification process, the improvement which consists in introducing enzyme and bacteriophage the product of the process with air from above by discharging jets of fluid extracted from the process at about the point of the longest detention period under considerable pressure revolving in a circular movement through the atmosphere into the body of the material being treated so that it penetrates to the muck at the bottom thereof.

24. In the chemo-biological-mechanical purification process, the improvement which consists in introducing enzyme and bacteriophage by discharging jets of fluid extracted from the process at about the point of the longest detention period in combination with a portion of the muck, the product of the proccess with air from above revolving in a circular movement under considerable pressure through the atmosphere into the body of the material being treated so that it penetrates a considerable distance into such material to cause bacteriophagia and to produce elutriation and agglutination.

25. In the chemo-biological-mechanical purification process, the improvement which consists in introducing enzyme, bacteriophage and precipitated matter, the product of the process, with air from above by discharging jets of fluid extracted from the process at about the point of the longest detention period under considerable pressure downwardly revolving in a circular movement through the atmosphere into the body of the material being treated so that it penetrates to the muck at the bottom thereof.

26. In the chemo - biological - mechanical purification process, the improvement which consists in introducing enzyme and bacteriophage by discharging jets under considerable pressure of fluid extracted from the process at about the point of the longest detention period in combination with a portion of the muck, the product of the process, with air from above revolving in a circular movement through the atmosphere into the body of the material being treated so that it penetrates for a a considerable distance into the material to cause bacteriophagia and to produce elutriation and sedimentation by agglutination.

27. In the chemo - biological - mechanical purification process for sewage and like materials, the improvement which consists in collecting a body of the material and discharging jets of such fluid extracted from the process under considerable pressure downwardly through the atmosphere into the liquid being treated so that it penetrates a considerable distance into the body of such liquid to produce violent agitation, aeration, circulation, elutriation, and sedimentation by agglutination.

EDWARD F. HARRISON.